United States Patent

Trevillyan

[15] 3,673,154
[45] June 27, 1972

[54] PROCESS FOR THE RECOVERY OF COBALT CATALYST

[72] Inventor: Alvin E. Trevillyan, Naperville, Ill.

[73] Assignee: Atlantic Richfield Company, New York, N.Y.

[22] Filed: June 26, 1970

[21] Appl. No.: 50,196

[52] U.S. Cl. ......................... 260/524 R, 23/61, 260/439 R
[51] Int. Cl. ........................... C01g 51/00, C07c 63/02
[58] Field of Search ............. 260/439 R, 524 R; 23/61; 252/472, 431

[56] References Cited

UNITED STATES PATENTS

| | | | |
|---|---|---|---|
| 2,865,708 | 12/1958 | Dinsmore et al. | 23/61 |
| 2,856,423 | 10/1958 | Grantham et al. | 260/524 |
| 3,557,173 | 1/1971 | Trevillyan | 260/525 |

OTHER PUBLICATIONS

De Bie et al., Cobalt, No. 15 (1962), p. 7.

Primary Examiner—Lorraine A. Weinberger
Assistant Examiner—R. S. Weissberg
Attorney—McLean, Morton and Boustead

[57] ABSTRACT

There is disclosed a cobalt catalyst recovery process which can provide substantially 100 percent recovery of cobalt from meta- or para-xylene oxidation reaction products, in a catalytically active form relatively free from side reaction, tramp metal and corrosion products. The reaction medium, after recovery of isophthalic or terephthalic acid products, is distilled or flashed, diluted with water to achieve a cobalt concentration and acetic acid concentration sufficient to yield a pH of the solution above 3.0 and to precipitate iron and chromium values. The reaction medium is separated from these precipitates and treated with aqueous sodium carbonate which serves to convert the side reaction organic acids to soluble sodium salts and the cobalt to insoluble cobalt carbonate. Nickel impurities may be converted to a soluble form. The cobalt carbonate is separated out by filtration or the like, and is reconverted to cobalt acetate by treating the carbonate with acetic acid and, if desired, a minor amount of water. The catalyst solution, preferably after water removal, is recycled to the oxidation process.

12 Claims, 1 Drawing Figure

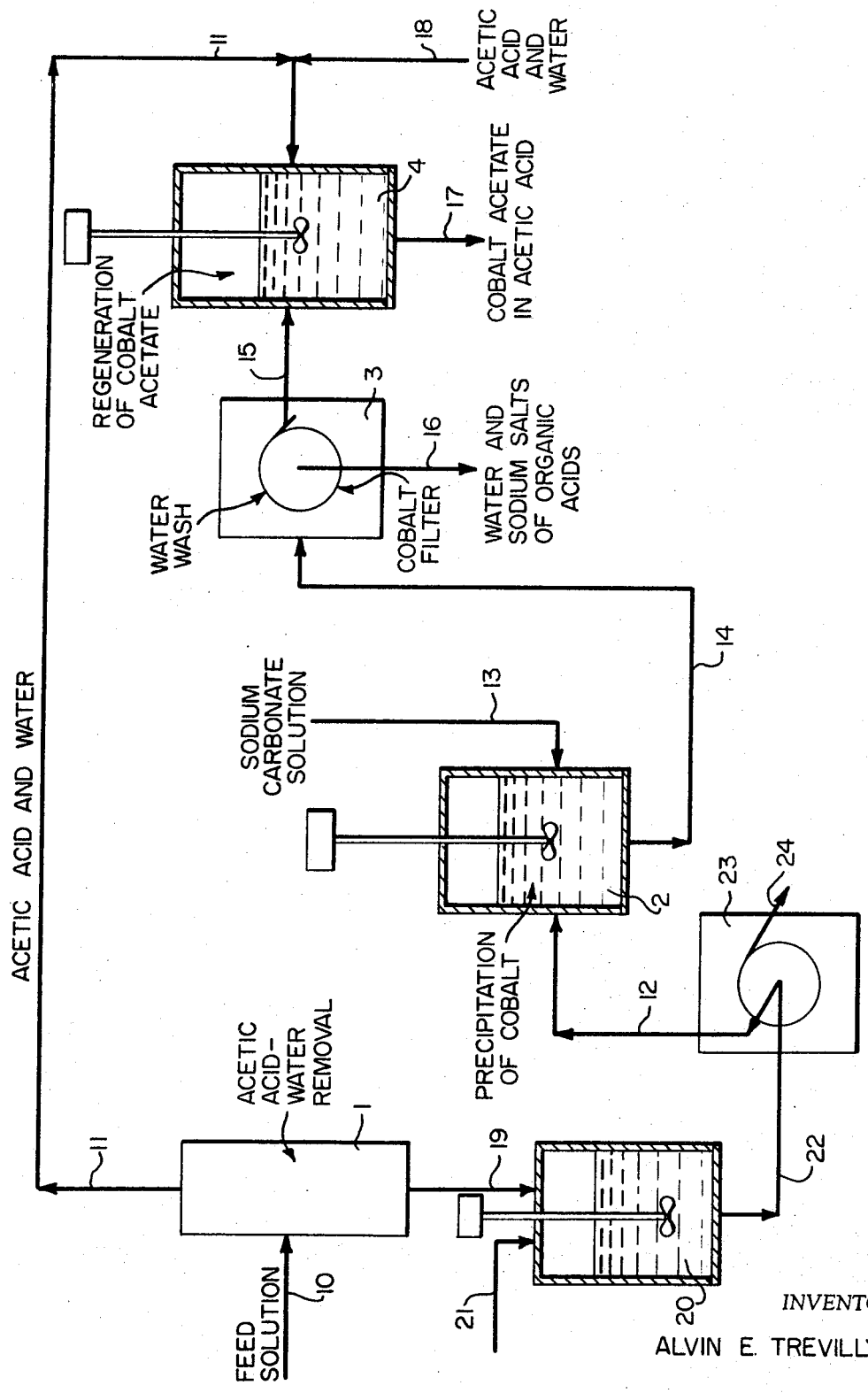

PROCESS FOR THE RECOVERY OF COBALT CATALYST

This invention relates to an improved process for the recovery of cobalt oxidation catalyst from mixtures produced by the liquid phase oxidation of meta- or para-xylenes to isophthalic acid or terephthalic acid, with an oxygen-containing gas in the presence of an acetic acid solvent medium and soluble cobalt acetate catalyst.

It is known that aromatic hydrocarbons having at least one and preferably two or more oxidizable substituents may be converted in the liquid phase and in the presence of an oxygen-containing gas, such as air, into carboxylic acid products by effecting the oxidation in the presence of a suitable solvent medium, preferably acetic acid, and an oxidation catalyst such as soluble carboxylic acid salts of catalytically active metals, e.g., cobalt, at elevated temperatures and, optionally, elevated pressures. In the oxidation of meta- or para-xylenes to the corresponding phthalic acids, it is preferred to conduct the reaction in acetic acid with cobalt acetate as a catalyst.

The mixture withdrawn from the reaction zone will ordinarily comprise an acetic acid slurry of the particular phthalic acid product, cobalt acetate, cobalt phthalate, and substantial amounts of extraneous materials, such as, for instance, metallic corrosion products, e.g., iron, chromium and nickel, by-product water, unreacted xylene, if any, and various secondary reaction products, such as mono- and dicarboxylic acids resulting from the conversion of isomers of xylene present as impurities in the primary xylene feed. These carboxylic acid materials will principally be phthalic and benzoic acids, with amounts of toluic acids also being present. When the isophthalic or terephthalic acid product is removed from the reaction mixture as by filtration, a mother liquor remains containing the catalyst, solvent, corrosion products, by-product water and the secondary reaction products. Minor amounts of such secondary reaction products are inevitably formed in the oxidation of xylene by any of the known methods. The particular amount and type of these materials present depend upon the incidence of the precursors in the xylene feedstock and upon the conditions and materials of construction of the oxidation system. In a feedstock of any isomer of xylene, such as meta-xylene, there are invariably minor but appreciable amounts of other isomers, such as ortho- and paraxylene and ethyl benzene, and smaller amounts of other impurities such as paraffins, naphthenes, and nitrogen- and sulfur-containing compounds. These materials will ordinarily be oxidized under the conditions of the reaction to the corresponding acids and, particularly in the case of ortho-xylene, which is oxidized to ortho-phthalic acid, can prove detrimental to the catalyst. Ortho-phthalic acid will combine with the cobalt catalyst to form a salt which has little or no catalytic activity. Further, contaminants such as metal corrosion products serve to inhibit, reduce, or destroy entirely the activity of the catalyst solution. The expense of the catalyst requires that it be reused, but the buildup of contaminants in the system renders necessary for satisfactory operation the elimination of such contaminants.

It is an object of this invention thus to provide a method for the oxidation of meta- and para-xylenes to dicarboxylic acids, including oxidation in the presence of acetic acid solvent and cobalt acetate catalyst, and a cobalt recovery system in which catalytically active cobalt acetate can be recovered from the reaction medium from the foregoing described oxidation of meta- and para-xylenes to dicarboxylic acids with significant removal of iron and chromium values as well as side reaction impurities. The invention of this application comprises oxidizing at least one of meta- and para-xylene to the corresponding phthalic acid in the presence of acetic acid solvent and cobalt acetate catalyst, removing the phthalic acid product from the reaction mixture to substantially deplete the mixture of phthalic acid, treating the resulting solution, as by flashing or distillation of the reaction medium or dilution with water, to achieve a cobalt concentration and acetic acid concentration sufficient to yield a pH of the solution of above 3.0 or above 3.1. At this pH, iron and chromium precipitate from the solution as insoluble products which can be removed from the reaction medium by suitable techniques such as filtration or the like. The solution can, for instance, contain a cobalt concentration of about 0.1 to 15 weight percent, preferably about 0.5 to 10 weight percent, and an acetic acid concentration of about 1 to 15 weight percent, preferably about 2 to 10 weight percent. After removal of the insoluble iron and chromium values the treated reaction medium can then be contacted with aqueous sodium carbonate which serves to convert the side reaction organic acids to soluble sodium salts, substantially all the nickel present to soluble nickel salts and the cobalt to insoluble cobalt carbonate. The solid cobalt carbonate is separated out by filtration or the like and is reconverted to water-soluble cobalt acetate by treating the carbonate with acetic acid which may contain a minor amount of water. The resulting cobalt acetate catalyst solution, preferably after removal of any water present, can be recycled to the oxidation process.

It has been found that a sodium carbonate treatment alone of the product-depleted mixture, while sufficient to remove the side reaction organic acid and nickel impurities, is insufficient to remove iron and chromium values. These metal impurities generally originate as corrosion products from the reaction vessels and other metallic equipment components in the reaction system. The use of stainless steel vessels has been observed to somewhat diminish the amounts of these metals in the reaction medium, but their presence has not been eliminated. These metal impurities tend to remain in solution and to accumulate over a period of time.

The invention will be further described with reference to the accompanying FIGURE which is a flow sheet of the process of this invention.

With reference to this FIGURE, the reaction mixture after recovery of isophthalic or terephthalic acid product enters through line 10 to vaporization zone 1, wherein acetic acid and water are removed from the mixture as overhead. Zone 1 may represent a distillation tower or flash apparatus or the like, where the volatile acetic acid and water are removed through line 11. The bottoms of the still or flash apparatus of zone 1 contain the cobalt and extraneous materials detrimental to the catalyst present in the catalyst mixture. The mixture thus freed of a substantial portion of acetic acid is then passed via line 19 to zone 20, where it is combined and mixed with water introduced via line 21. The amount of acetic acid and water removed in zone 1 and recombination of water through line 21 is adjusted to achieve in zone 20 a cobalt concentration and an acetic acid concentration, as noted above, sufficient to yield a pH of the solution of above 3.0, or preferably above 3.1. The water is preferably recovered from the acetic acid and water removed from the distillation tower or flash apparatus through line 11. A solid, insoluble precipitate of the iron and chromium values present in solution is formed at this pH. The mixture can be maintained at elevated temperature for sufficient time for the precipitate to form larger agglomerates which are more readily separated, and is then passed via line 22 to separation zone 23 which may be a filtration or centrifugal separation apparatus, or the like. The solid precipitates are removed via line 24 for disposal and the purified reaction medium solution is passed via line 12 to zone 2, where it is combined and mixed with an aqueous solution of sodium carbonate from line 13. A solid, insoluble precipitate of cobalt carbonate is formed and the aromatic acids form soluble sodium salts. The nickel present forms a partially soluble salt which may precipitate. The mixture can be maintained at elevated temperature for sufficient time for the precipitate to form larger agglomerates which are more readily separated, and is then passed via line 14 to separation zone 3 which may be filtration or centrifugal separation apparatus, or the like. Solid cobalt carbonate is recovered, washed with water to remove excess sodium entrained in the solid, while the aqueous filtrate containing the water-soluble salts, is removed via line 16. The washed, solid cobalt carbonate is passed via line 15 to regeneration zone 4 where it is contacted with acetic acid and water from zone 1 via line 11, if desired, to react the acid with the carbonate salt, reforming cobalt acetate which is returned via line 17 as catalyst to water removal and then to the oxidation process.

The sodium carbonate is conveniently supplied as a dilute aqueous solution, for instance, an about 1 to 10 or 15 weight percent solution. It has been found that an approximate 5 weight percent solution is convenient, although more or less concentrated solutions are also effective. The solution is preferably supplied in at least the stoichiometric amount necessary to react completely with the cobalt and any acid present, and desirably at least about 10 weight percent excess to insure the formation of sodium salts of the aromatic acids. If less than an approximate 10 percent excess of the stoichiometric amount is supplied, a portion of the aromatic acids may not form soluble salts and may remain with the cobalt and contaminate the catalyst solution and a part of the cobalt may not be recovered.

It has further been found that the sodium carbonate may be utilized in an inexpensive form, such as soda ash, with no detrimental effect on the catalyst. In this manner, substantial savings on the cost of reagent are possible. Soda ash is an inexpensive mineral form of anhydrous sodium carbonate.

The reaction mixture is ordinarily added to the selective precipitation zone 20 at elevated temperature, although the mixture may be heated after mixing. It is preferred that a temperature of at least about 150° F. be maintained under essentially liquid phase conditions. The reaction mixture can be present in precipitation zone 20 for a time sufficient to effect a substantially complete precipitation of iron and chromium values which can be, for example, from about 5 minutes up to about one hour or more, preferably from about 10 minutes to 20 minutes. It is most preferred that a temperature of at least about 170° F., preferably at least about 195° F. be attained in the cobalt precipitation zone before the reaction mixture is filtered. The mixture thus present in zone 2 may be heated such that the mixture is contacted with the aqueous sodium carbonate at a temperature of at least about 75° F., after mixing prior to filtration. If an elevated temperature, e.g., above about 125° F. is not achieved, filtration will be difficult and slow, and some cobalt may pass the filter and be lost. The temperature must not be above the temperature at which the cobalt carbonate will decompose, and will preferably be below the boiling point of the solution. Time is not an important consideration, since the precipitation is quite rapid at temperatures of about 170° to 195° F. and higher.

The cobalt carbonate is separated from the mixture by any convenient means, as by filtration or in a centrifugal separator, and can be washed with water to remove sodium which is entrained in the cobalt carbonate. A wash water to cobalt weight ratio of above about 20:1 can be used with advantage in reducing the sodium content. Below this ratio, the sodium may not be removed as completely as is possible, and adequate sodium removal is usually obtained at ratios below about 400:1. Generally, the amount of water wash required is dependent upon the ratio of sodium to cobalt; with greater amounts of sodium, a larger amount of wash water is required. Often, a water-cobalt ratio of about 65:1 is effective where the cobalt is recovered by filtration. Recovery by other means may increase the water requirements of the system.

The washed cobalt carbonate is then reconverted to cobalt acetate. The conversion is achieved by reacting the carbonate with acetic acid. Carbon dioxide and cobalt acetate are produced in the reaction. Water, in a minor amount of up to about 10 or 15 weight percent of the acetic acid can be present. The amount of acetic acid can be as little as approximately the stoichiometric amount required to react with the cobalt carbonate, but ordinarily enough will be provided to make up a cobalt acetate solution in acetic acid in the concentration to be utilized in the oxidation reaction. The amount of water will ordinarily be as little as possible to achieve the conversion of cobalt carbonate to cobalt acetate, since the water is usually subsequently removed and excess amounts make separation more difficult. Ordinarily, the cobalt carbonate is converted more rapidly at elevated temperatures, but lower temperatures, even ambient conditions are suitable. As a matter of convenience, it is often desirable to maintain the cobalt carbonate and the acetic acid at the reflux temperature. The resulting cobalt acetate solution, after removal of any excess water, is ready for recycle to the oxidation zone to serve as the oxidation catalyst.

In the xylene oxidation stage, a feed is passed to the reactor comprising the appropriate xylene isomer, i.e., meta- or para-xylene, or mixtures hereof, which will contain minor amounts of the other aforementioned isomers, and other impurities, acetic acid, and the cobalt acetate catalyst. The reactor feed can also contain an oxidation promoter such as a halide or an aldehyde. There may also be present a minor amount of water, on the order of about 1 percent by weight, to insure that the catalyst remains in solution and is not dehydrated to an insoluble form. The mixture is then contacted in the reactor with air or other source of oxygen at elevated temperatures, often about 225° to 275° F. and at elevated pressure sufficient to maintain the mixture in the liquid phase. The oxidation of the side groups occurs readily and the stream removed from the reactor contains the dibasic acid corresponding to the feed, i.e., isophthalic acid for a meta-xylene feed or terephthalic acid for a para-xylene feed, the aforementioned by-product materials, catalyst, acetic acid solvent, and water produced in the oxidation. The mix is cooled to precipitate the product acid, which is recovered by conventional solid-liquid separation procedures, such as filtration and the like, and the mixture depleted in product is treated to recover the catalyst from the by-product materials and metallic contaminants for recycle to the reactor with fresh feed.

The invention will be further described with reference to the following examples:

EXAMPLE I

Catalyst residue from the air oxidation of xylenes in the presence of cobalt acetate as the catalyst was treated in a batch process for the removal of chromium and iron. The reaction medium, after removal of the phthalic acids product, was transferred to a flash drum where part of the acetic acid solvent medium and water were flashed off. The flash drum bottoms were transferred to a selective precipitation vessel and diluted with water to give a resulting mixture having a pH of about 4 and containing 4.0 percent acetic acid and 1.0 percent cobalt. The solution was heated to a temperature of about 200° F. for 15 minutes and filtered to remove insoluble chromium and iron precipitates. After filtration, the solution was treated with an excess of dilute aqueous sodium carbonate and the cobalt carbonate separated and washed by filtration was reconverted to cobalt acetate by treating the carbonate with acetic acid and a minor amount, e.g., about 1 percent of water. The regenerated catalyst solution was analyzed, giving the results listed below in Table I. As may be noted, significant amounts of iron and chromium were removed but the nickel apparently remained in the form of an insoluble salt and was not removed in the treatment.

TABLE I

|    | Feed    | Regenerated Catalyst Solution | Percent Removal |
|----|---------|-------------------------------|-----------------|
| Co | 0.58%   | 0.91%                         |                 |
| Fe | 90 ppm  | 5 ppm                         | 97              |
| Cr | 17 ppm  | 12 ppm                        | 65              |
| Ni | 13 ppm  | 23 ppm                        | 0               |

EXAMPLE II

In each run of this example, 463 g. of feed solution was used having the metals composition shown in Table I. The following organic acids were added in each run to simulate a spent catalyst solution.

3.1 g. Meta toluic acid
2.5 g. isophthalic acid
3.5 g. ortho phthalic acid
0.3 g. terephthalic acid
0.7 g. benzoic acid The resulting mixture was concentrated by heating to vaporize acetic acid, and was then diluted with deionized water. The diluted mixture was maintained at 200° F. for 15 minutes, cooled and then filtered through a gravity filter. The filtrate was then analyzed for metals by X-ray.

A number of such runs were made and the cobalt concentration was maintained at levels of approximately 0.5, 1.0, and 1.7 percent; and the acetic acid concentration was varied. The results are shown in Tables II, III, and IV.

TABLE II

| Percent acetic acid | Filtrate composition (after pH adjustment) | | | | | Composition of total mixture before filtration | | | |
|---|---|---|---|---|---|---|---|---|---|
| | Percent Co | P.p.m. Fe | P.p.m. Cr | P.p.m. Ni | pH | Percent Co | P.p.m. Fe | P.p.m. Cr | P.p.m. Ni |
| 6.0 | .55 | 8 | 2 | 16 | 3.64 | 0.55 | 82 | 16 | 13 |
| 10.0 | .55 | 7 | 1 | 10 | 3.43 | | | | |
| 15.0 | .55 | 18 | 5 | 7 | 3.15 | | | | |
| 20.0 | .56 | 60 | 11 | 9 | 3.0 | | | | |

TABLE III

| Percent acetic acid | Filtrate composition (after pH adjustment) | | | | | Composition of total mixture before filtration | | | |
|---|---|---|---|---|---|---|---|---|---|
| | Percent Co | P.p.m. Fe | P.p.m. Cr | P.p.m. Ni | pH | Percent Co | P.p.m. Fe | P.p.m. Cr | P.p.m. Ni |
| 2.0 | 1.11 | 8 | 9 | 31 | 4.36 | 1.1 | 164 | 32 | 25 |
| 4.0 | 1.08 | 5 | 1 | 29 | 4.05 | | | | |
| 5.0 | 1.08 | 10 | 9 | 31 | 3.90 | | | | |
| 8.0 | 1.11 | 10 | 1 | 28 | 3.82 | | | | |
| 10.0 | 1.10 | 10 | 10 | 27 | 3.70 | | | | |
| 15.0 | 1.14 | 8 | 4 | 22 | 3.40 | | | | |
| 20.0 | 1.08 | 36 | 15 | 22 | 3.20 | | | | |
| 25.0 | 1.15 | 98 | 29 | 23 | 3.10 | | | | |

TABLE IV

| Percent acetic acid | Filtrate composition (after pH adjustment) | | | | | Composition of total mixture before filtration | | | |
|---|---|---|---|---|---|---|---|---|---|
| | Percent Co | P.p.m. Fe | P.p.m. Cr | P.p.m. Ni | pH | Percent Co | P.p.m. Fe | P.p.m. Cr | P.p.m. N. |
| 2.0 | 1.81 | 4 | 16 | 48 | 4.50 | 1.7 | 270 | 51 | 40 |
| 6.0 | 1.72 | 26 | 36 | 43 | 3.95 | | | | |
| 10.0 | 1.77 | 8 | 21 | 44 | 3.65 | | | | |
| 20.0 | 1.68 | 49 | 24 | 28 | 3.30 | | | | |

It is claimed:

1. An improved method for the oxidation of aromatic materials containing oxidizable substituents to carboxylic acids comprising the steps of:
   a. oxidizing in the presence of an oxygen-containing gas at least one of meta- and para-xylene to the corresponding phthalic acid in the presence of acetic acid solvent and cobalt acetate catalyst;
   b. removing the phthalic acid product from the reaction mixture to substantially deplete the mixture of phthalic acid;
   c. treating the resulting mixture by a method comprising removing acetic acid and by-product water from the product-depleted mixture to achieve a cobalt concentration and acetic acid concentration sufficient to yield a pH above about 3.0 whereby contained iron and chromium values are precipitated and removing the precipitated values from the mixture;
   d. treating the resulting mixture with aqueous sodium carbonate whereby insoluble cobalt carbonate is formed;
   e. recovering cobalt carbonate from the treated mixture;
   f. converting the cobalt carbonate to catalytically active cobalt acetate essentially free from aromatic acids by contacting said carbonate with excess acetic acid at elevated temperature; and
   g. charging resulting catalytically active cobalt acetate to the oxidation reaction of step (a).

2. The method of claim 1 wherein the mixture in step (c) is treated to produce a cobalt concentration of from about 0.1 to 15 weight percent based on the weight of the reaction mixture and an acetic acid concentration of from about 1 to 15 weight percent based on the weight of the reaction mixture.

3. The method of claim 2 wherein the mixture in step (c) is treated to produce a cobalt concentration of from about 0.5 to 10 weight percent based on the weight of the reaction mixture and an acetic acid concentration of from about 2 to 10 weight percent based on the weight of the reaction mixture.

4. The method of claim 2 wherein the mixture in step (c) is treated to produce a pH of above about 3.1.

5. The method of claim 4 wherein the aqueous sodium carbonate is supplied in step (d) in at least a 10 weight percent excess of the stoichiometric amount necessary to react with the cobalt and any acids present.

6. The method of claim 5 wherein the mixture from step (c) is treated with dilute aqueous sodium carbonate at a temperature of at least about 75° F.

7. The process of claim 5 wherein said conversion of cobalt carbonate in step (f) is conducted in the presence of water in an amount up to about 15 weight percent water based on the weight of the reaction mixture.

8. The process of claim 1 wherein said conversion of cobalt carbonate in step (f) is conducted in the presence of water in an amount up to about 15 weight percent water based on the weight of the reaction mixture.

9. The process of claim 8 wherein the water and acetic acid are supplied in step (f) at least in part by acetic acid and by-product water removed from the reaction mixture in step (c).

10. The method of claim 7 wherein water is subsequently removed from the solution of cobalt acetate and acetic acid from step (f).

11. The method of claim 10 wherein the cobalt carbonate from step (e) is washed with water to remove salts of sodium before conversion to cobalt acetate in step (f).

12. The method of claim 9 wherein water is subsequently removed from the solution of cobalt acetate and acetic acid from step (f).

* * * * *